(12) United States Patent
Samuelsson et al.

(10) Patent No.: US 8,837,591 B2
(45) Date of Patent: Sep. 16, 2014

(54) IMAGE BLOCK CLASSIFICATION

(75) Inventors: Jonatan Samuelsson, Skarpnäck (SE); Kenneth Andersson, Gävle (SE); Clinton Priddle, Upplands Väsby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1037 days.

(21) Appl. No.: 12/524,298

(22) PCT Filed: Jan. 14, 2008

(86) PCT No.: PCT/SE2008/050033
§ 371 (c)(1),
(2), (4) Date: Feb. 26, 2010

(87) PCT Pub. No.: WO2008/091205
PCT Pub. Date: Jul. 31, 2008

(65) Prior Publication Data
US 2010/0149422 A1    Jun. 17, 2010

Related U.S. Application Data

(60) Provisional application No. 60/897,512, filed on Jan. 26, 2007.

(51) Int. Cl.
*H04N 5/14* (2006.01)

(52) U.S. Cl.
USPC .................................................. 375/240.16

(58) Field of Classification Search
USPC .................................................. 375/240.16
See application file for complete search history.

(56) References Cited

U.S. PATENT DOCUMENTS

| | | | | |
|---|---|---|---|---|
| 5,592,228 A | * | 1/1997 | Dachiku et al. | 348/416.1 |
| 5,764,803 A | | 6/1998 | Jacquin et al. | |
| 6,023,300 A | * | 2/2000 | Han et al. | 375/240.16 |
| 7,254,268 B2 | * | 8/2007 | Zhao et al. | 382/190 |
| 2007/0153898 A1 | * | 7/2007 | Yim | 375/240.16 |

FOREIGN PATENT DOCUMENTS

| WO | WO 9844739 A1 | 10/1998 |
|---|---|---|
| WO | WO 0141451 A1 | 6/2001 |

OTHER PUBLICATIONS

Zhang Kui et al: "Image sequence coding using multiple-level segmentation and affine motion estimation" IEEE Journal on Selected Areas in Communications, 1997, vol. 15, No. 9, pp. 1704-1713.
Meier, T et al: "Automatic segmentation of moving objects for video object plane generation", IEEE Transactions on Circuits and Systems for Video Technology, 1998, Sep., vol. 8, No. 5, pp. 525-538.

* cited by examiner

*Primary Examiner* — Tung Vo
*Assistant Examiner* — Obafemi Sosanya (57) ABSTRACT

An image processing method involves determining a global motion between a reference frame and a current frame in a frame sequence. A reference block is identified in the reference frame for a current block based on the global motion. A classification parameter is calculated based on the pixel values of the current block and the reference block. The parameter can be used for classifying the block as belonging to the background or foreground of the current frame. The parameter is preferably also utilized in frame rate-up conversion when extrapolating or interpolating new frames.

15 Claims, 8 Drawing Sheets

IMAGE BLOCK CLASSIFICATION

This application claims the benefit of U.S. Provisional Application No. 60/897,512, filed Jan. 26, 2007, the disclosure of which is fully incorporated herein by reference.

TECHNICAL FIELD

The present invention generally relates to image processing, and in particular to providing a classification of image blocks in an image of a video sequence of image frames.

BACKGROUND

The motivation of frame rate up-conversion is that a video sequence with higher frame rate is generally considered to give higher quality experience than a video sequence with lower frame rate. The frame rate of a video sequence can be increased by inserting predicted frames in between existing frames. A good approach is to predict the in-between frame using bi-directional block based motion estimation [1], searching for linear motions between the previous frame and the next frame in the input video sequence. It is possible to use non-linear approaches that can represent acceleration, but the linear approach is used because of its simplicity and low complexity. The in-between frame is divided into blocks and to each of these a motion vector must be assigned in some way. However, it is possible that a set of motion vectors are candidates for the current block, and only one of these candidate motion vectors will be selected to represent the motion.

When an evaluation is performed concerning which of these candidate vectors to choose, there are different parameters that can be used. The most common is the sum of absolute differences (SAD) [2], which is calculated from the differences of the values between the pixels pointed out in the previous frame and the pixels pointed out in the next frame.

Figure 8:
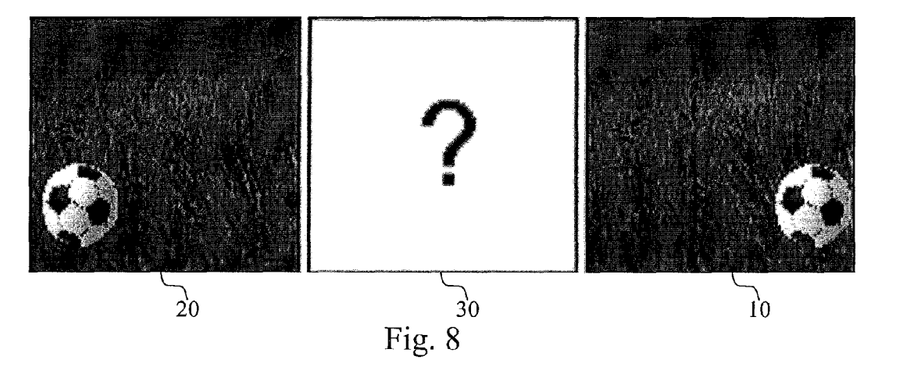
FIG. 8 is a flow diagram illustrating two image frames with an intermediate image frame to be interpolated.

In some cases two (or more) different motion vectors will have low SAD value but only one can be selected to represent the motion. FIG. 8 shows two frames 10, 20 in a video sequence. It is not hard (for a human) to guess the contents of the in-between frame 30.

Since the background is unchanged it would probably be the same as in the two adjacent frames 10, 20, and since there is a ball to the left in the preceding frame 20 and a ball to the right in the following frame 10, it is intuitional to think that there is a ball in the middle of the in-between frame 30. The motion vector that points from the ball in frame 10 to the ball in frame 20 gives a low SAD value and passes the middle of the image at half of its length.

However, the area in the middle looks exactly, or almost exactly, the same in the preceding frame 20 as in the following frame 10. A local consideration would yield that this area will look the same in the in-between frame 30, and the zero motion vector gives a very low SAD value. Thus, the prior art techniques for selection motion vector may run into problems in this situation. Since the zero motion of the background is the easiest to capture exactly, this motion vector will be chosen instead of the motion vector that corresponds to the motion of the ball. This could result in an in-between picture 30 with no ball at all.

SUMMARY

The present invention overcomes these and other drawbacks of the prior art arrangements.

It is a general object of the present invention to provide a classification parameter that can be utilized for discriminating between foreground and background in an image frame.

It is a particular object of the invention to provide a frame interpolation/extrapolation that utilizes classification parameters when selecting candidate pixel blocks.

These and other objects are met by the invention as defined by the accompanying patent claims.

Briefly, the present invention involves determining a classification parameter for a current group of at least one image element in a current frame of a frame sequence. A representation of a global motion of image element property values from a reference frame in the sequence to the current frame is determined, preferably based on displacement vectors assigned or estimated for the groups in the current block. A reference group is identified in the reference frame for the current group utilizing the determined global motion representation. A classification parameter of the invention is then calculated based on a difference in property values of the image elements in the current group and the reference group, preferably as a sum of the absolute values of the differences or a sum of the squared differences in property values for image elements occupying corresponding pixel positions in the current group and the reference group.

The determined classification parameter is indicative of whether the current group belongs to the foreground or the background of the current frame and can be utilized in a group classification. Then, if the parameter exceeds a threshold, the group is regarded as a foreground group in the frame, otherwise it belongs to the background.

A preferred implementation identifies a second reference group in the reference frame for the current group utilizing the displacement vector associated with the current group. The global motion representation is thereafter utilized for identifying a second group in the current frame starting from the identified second reference group. A second classification parameter is calculated based on the property values of the image elements in the second group and the second reference group. The classification of the current group is then performed based on both the first and second classification parameters.

The classification parameters of the invention are advantageously utilized during frame rate up-conversion when interpolating or extrapolating a new frame in a video sequence based on an existing first and second frame. A set of multiple candidate groups present in the first frame is provided. A classification parameter of the invention is determined for each of the candidate groups. Each candidate group has an associated displacement vector that is utilized for identifying a respective reference group in the second frame. A respective difference parameter is calculated based on a difference in property values for a candidate group and its identified reference group. The selection of candidate group to use when interpolating/extrapolating an image element group in the new frame is performed based on both the prior art difference measures and the classification parameters of the invention. This selection utilizes the classification parameters for weighting up groups belonging to the foreground over background groups in the selection. The property values of the group in the new frame are determined based on the selected group and its identified reference group.

SHORT DESCRIPTION OF THE DRAWINGS

The invention together with further objects and advantages thereof, may best be understood by making reference to the following description taken together with the accompanying drawings, in which.

DETAILED DESCRIPTION

Throughout the drawings, the same reference characters will be used for corresponding or similar elements.

The present invention generally relates to image and frame processing in a sequence of frames for the purpose of identifying frame portions belonging to the background of the frame and the foreground of the frame, respectively.

This classification of frame portions is of high value during frame rate up-conversion to thereby be used in the decision of candidate pixel blocks employed for interpolating or extrapolating pixel values in a constructed frame in the sequence.

In the present invention, a video or frame sequence comprises multiple, i.e. at least two, frames or pictures. Such a frame can in turn be regarded as composed of a series of one or more slices, where such a slice consists of one or more macroblocks of image elements or pixels. In the present invention, the expression "image element" is used to denote a smallest element of a frame or picture in a sequence. Such an image element has associated image element properties, such as color (in the red, green, blue, RGB, space) or luminance (Y) and chrominance (Cr, Cb or sometimes denoted U, V). A typical example of an image element is a pixel of a frame or picture. The present invention is particularly adapted to a video sequence comprising multiple consecutive frames at a given frame rate. However, the invention is also applicable to a frame sequence comprising at least two frames or images. Such a sequence could contain two pictures taken at a same time but from different positions or angles. Thus, the invention is applicable to any frame sequence comprising at least two frames that could be associated with different time instances of a video sequence and/or different positions or angles.

The image elements are organized into groups of image elements. The expression "group of image element" denotes any of the prior art known partitions of frames and slices into collections of image elements that are handled together during decoding and encoding. Generally, such a group is a rectangular (M×N) or square (M×M) group of image elements. An example of such a grouping is a macroblock in the video compression standard. Such a macroblock generally has a size of 16×16 image elements. A macroblock can consists of multiple so-called sub-macroblock partitions, such as 16×8, 8×16, 8×8, 8×4, 4×8 and 4×4 image elements. The 8×8 sub-macroblock partition is often denoted as a sub-macroblock or sub-block, whereas a 4×4 partition is often denoted block.

Figure 1:
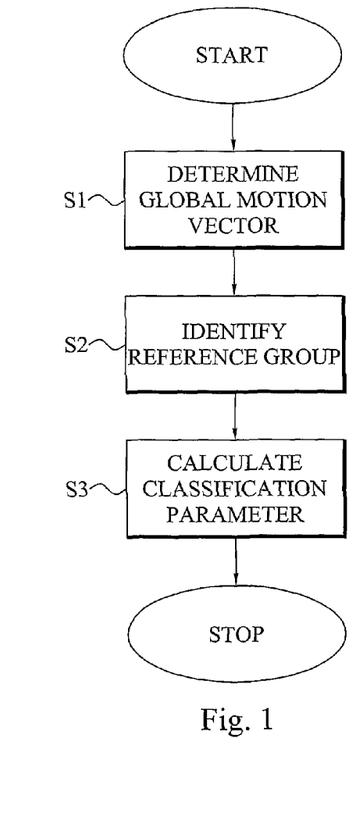
FIG. 1 is a flow diagram of an image processing method according to an embodiment of the present invention.

FIG. 1 is a flow diagram of an image processing method applicable to a frame sequence comprising multiple frames. Each frame in the sequence comprises multiple groups or blocks of at least one image element, typically multiple, such as 4×4 image elements. The method starts in step S1, which determines a representation of a global motion of image element property values from at least a reference portion of a reference frame to at least a portion of a current frame in the frame/video sequence. This global motion representation is indicative of the global or overall movement of pixels when going from the reference frame to the current frame in the sequence.

A next step S2 uses the determined global motion representation for identifying, for a current group of at least one image element in the current frame, a reference group of at least one image element in the reference frame. In other words, a reference group in the reference frame, to which the global motion representation points when applied to the position of the current group in the current frame is identified in step S2.

The global motion representation must not necessarily be an integer motion. In clear contrast, property values of a reference group can be filtered to obtain sub-pel values, such as half-pel, quarter-pel or even eighth-pel values. This means that also decimal number are possible for the vector components of the global motion representation.

Step S3 calculates a classification parameter for the current group based on the property values of the image elements of the current group and the reference group. This classification parameter is, thus, representative of the difference in image element property values between the current group and its corresponding reference group identified based on the global motion representation. The classification parameter is furthermore indicative of whether the current group belongs to a foreground or a background of the current frame. Generally and depending on which particular parameter format selected for the classification parameter, a large parameter value is obtained if the current group belongs to the foreground, while a comparatively lower parameter value signals that the current group forms part of the background portion of the current frame.

The classification parameter can then be used, as is described further herein, for classifying different groups of the current frame but also for other purposes such as when interpolating/extrapolating new frames during frame rate up-conversion.

The operations conducted in FIG. 1 are preferably applied to multiple, such as all, image element groups in the current frame. In such a case, steps S2 and S3 are repeated for all those groups in the current frame to thereby obtain a respective classification parameter for the different image element groups. The method then ends.

Figure 2:
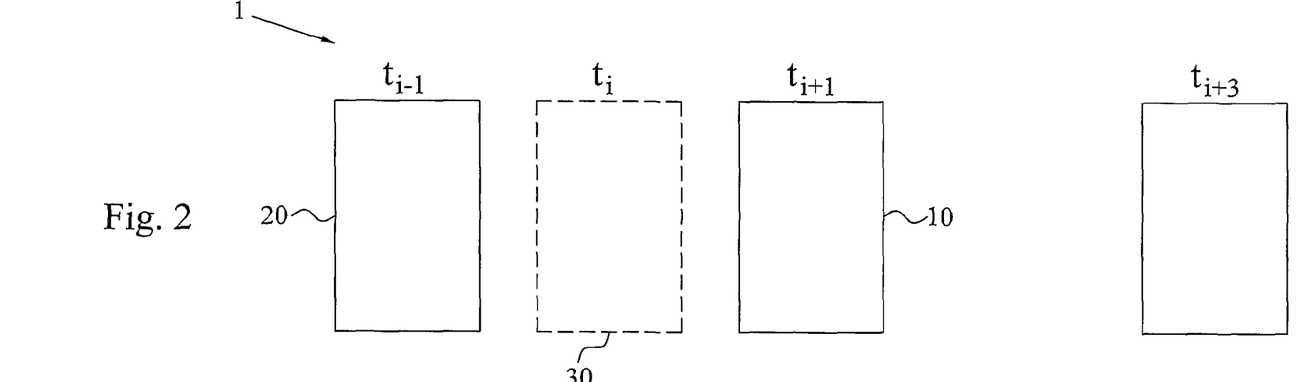
FIG. 2 is a schematic overview of a video sequence of frames to which the teachings of the invention can be applied.

FIG. 2 is a schematic overview of a video sequence 1 of frames 10, 20, to which the teachings of the present invention can be applied. The original video sequence comprises a number of frames 10, 20 associated with different time instances, $t_{i-1}$, $t_{1+1}$, $t_{i+3}$ and so on. In the case of rate-up conversion, one or more additional frames 30 are determined to correspond to a time instance, $t_i$, occurring between two original frames 10, 20 in the sequence 1. When applying the present image processing method to such a sequence, the frame 10 at time instance $t_{i+1}$ can be regarded as the current frame, while the previous original frame 20 at time instance $t_{i-1}$ will be the reference frame. Alternatively, the different frames 10, 20 can originate from different camera views but be of a same or near same time point.

Figure 3:
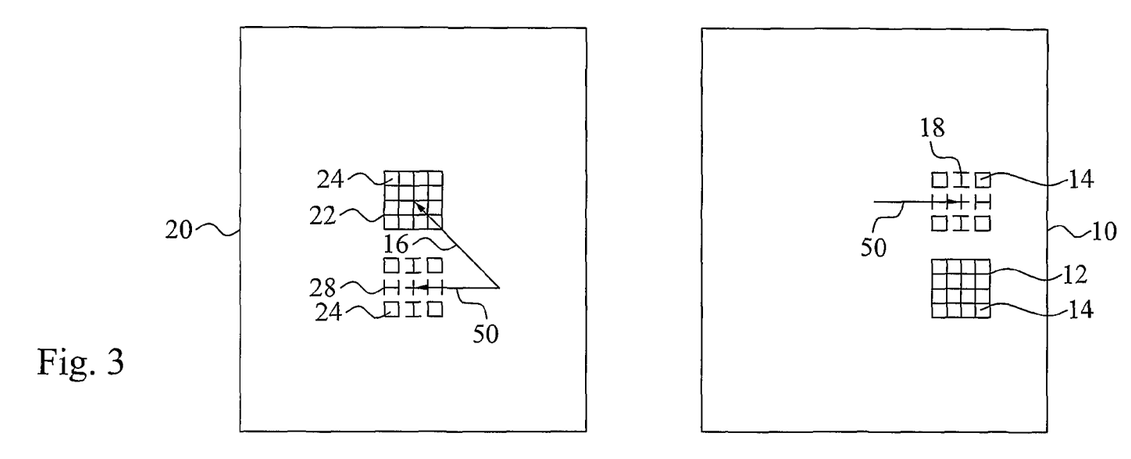
FIG. 3 is an illustration of two frames of a video sequence.

FIG. 3 illustrates the current frame 10 and reference frame 20 in more detail. A current group 12 of at least one image element 14 in the current frame 10 is to be processed according to the present invention for the purpose of calculating a classification parameter. A global motion representation 50 has been calculated and is indicated in the figure. This global motion representation 50 can be regarded as a vector that points from the corresponding position of the current group 12 but in the reference frame 20 up to a group 28 of at least one image element 24 that will be the reference group 28 in the reference frame 20 for the current group 12. As is shown in the figure, the size of the reference group 28 in terms of the number of image elements 24 could the same as the corresponding size of the current group 12. However, if sub-pixel values are used, these pixel values can be determined by filtering a larger portion of the reference frame than the group size, which is well known in the art.

The global motion representation 50 of the present invention can take any vector value $$v = \begin{bmatrix} x \\ y \end{bmatrix},$$

ranging from the zero vector up to non-zero values for the vector components x and y, depending on how the pixel parameter values are moved when going from the reference frame 20 to the current frame 10 in the sequence.

Figure 4:
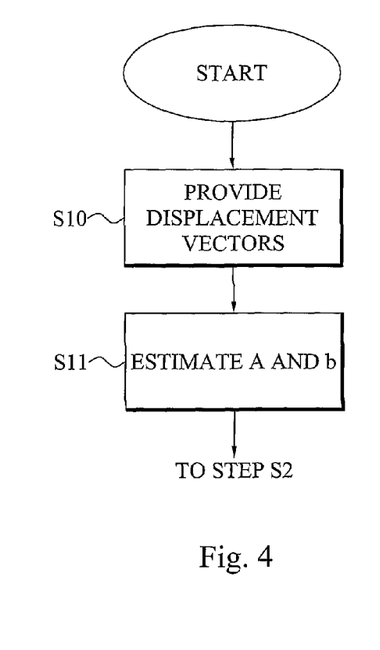
FIG. 4 is a flow diagram illustrating an embodiment of the global motion vector determining step of FIG. 1.

FIG. 4 is a flow diagram illustrating a preferred embodiment of determining the global motion representation of the present invention. The method starts in step S10, where a vector set is provided. This vector set comprises, for each image element group in at least a portion of the current frame a respective associated displacement or motion vector referring to a reference group of at least one image element in the reference frame. Thus, each group in at least a portion of the current frame, preferably each group in the frame, has an assigned displacement vector that is pointing to or associated with a reference group in the reference frame.

The displacement vectors can be provided from a coded motion vector field of a video codec, such as H.264. Such motion vectors are traditionally used in inter coding of frames and can be re-used but for another purpose according to the invention. If no such motion vectors are available from the video codec, they can be determined from a motion estimation search. In such a case, a dedicated motion estimation search is conducted, preferably according to prior art algorithms but for the purpose of generating a motion vector set that can be used for determining the global motion representation of the invention.

Generally, each image element group in the current frame can have an associated motion vector generated by the video codec or from the motion estimation. However, some of the groups may not have an assigned motion vector as these are coded as intra blocks by the video codec. In such a case, such groups can be omitted from the processing of the motion vectors of the invention. This means that only a portion (though a major portion) of the groups in the current frame and their assigned motion/displacement vectors are utilized in the following step S11 for calculating the global motion representation.

The next step S11 uses the displacement vectors from the provided (fetched or calculated) vector set from step S10 to determine a global motion vector. In a simple implementation, the global motion representation is determined as an average vector of the displacement vectors in the vector set. This is a computationally simple embodiment, though far from optimal for the purpose of obtaining an accurate global motion representation. Therefore, in a preferred embodiment of step S11, a position-dependent global motion vector or representation having vector component values that can vary for different image element positions in the current frame, i.e. v=v(x,y), is determined in step S11.

A preferred implementation of step S11 utilizes the following representation of the global motion representation:

$$v = Ax + b$$

where $$x = \begin{bmatrix} x \\ y \end{bmatrix}$$

is the position of a current group in the current frame, $$v = \begin{bmatrix} v_x \\ v_y \end{bmatrix}$$

is the global motion representation of the current group, $$A = \begin{bmatrix} a_{11} & a_{12} \\ a_{21} & a_{22} \end{bmatrix}$$

and $$b = \begin{bmatrix} b_1 \\ b_2 \end{bmatrix}$$

are a matrix and a vector that are to be estimated based on the displacement vectors provided in step S10. In order to calculate the values for the matrix A and the vector b, a least square method is preferably used for the provided displacement vector. Thus, the matrix and vector that gives a best result, in terms of minimizing a squared difference between the displacement vectors and the global motion representation, are estimated in step S11. The final global motion representation v=Ax+b captures most common background motions, such as camera panning, zooming and rotation.

The above concept can of course be applied to other parameterizations of a global motion representation, such as $$v = \begin{bmatrix} a_{11} & a_{12} \\ a_{21} & a_{22} \end{bmatrix} \begin{bmatrix} x^2 \\ y^2 \end{bmatrix} + \begin{bmatrix} b_{11} & b_{12} \\ b_{21} & b_{22} \end{bmatrix} \begin{bmatrix} x \\ y \end{bmatrix} + \begin{bmatrix} c_1 \\ c_2 \end{bmatrix}$$

or higher order components. The method then continues to step S2 of FIG. 1, where the determined representation of the global motion is applied, using the group coordinates x and y of the current group to calculate the global motion at that point and identify the reference group in the reference frame.

The usage of displacement vectors from the video codec or from a dedicated motion estimation search is a particular embodiment of obtaining a displacement vector set that are used for determining a global motion representation of the present invention. Other embodiments can instead be used and are contemplated by the invention. For instance, a motion estimation that is based on phase correlation can be used to obtain a representation of the global motion. Another example is of motion estimation for the global motion is pel-recursive, i.e. pixel-based motion estimation.

Figure 5:
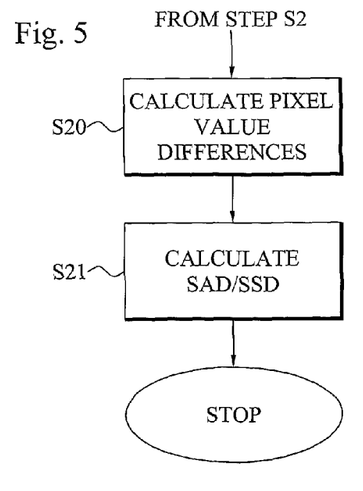
FIG. 5 is a flow diagram illustrating an embodiment of the measure calculating step of FIG. 1.

FIG. 5 is a flow diagram illustrating a particular embodiment of the parameter calculating step S3 of FIG. 1. The method continues from step S2 of FIG. 1. A next step S20 calculates a difference between the parameter values of the image elements in the current group and in the identified reference group. These differences are calculated for each image element in the current group and based on the property value of that image element and the property value of the reference image element having the corresponding position in the reference group as the image element has in the current group. In other words, the differences are calculates as $D_{x,y}=IE_{x,y}-RIE_{x,y}$, where $IE_{x,y}$ is the property value of image element at position x,y in the current group, $RIE_{x,y}$ is the property value of the reference image element at position x,y in the reference group and $D_{x,y}$ is the difference.

A next step S21 calculates the classification parameter based on the absolute values of the differences. Different embodiments can be used in this parameter calculation based on the absolute values. A first embodiment utilizes a classification parameter that is based on the sum of the absolute differences (SAD):

$$CP = \sum_y \sum_x |IE_{x,y} - RIE_{x,y}|$$

Another preferred embodiment of classification parameter is the sum of squared differences (SSD):

$$CP = \sum_y \sum_x (IE_{x,y} - RIE_{x,y})^2$$

In both these cases, a high SAD or SSD values is obtained for groups belonging to the foreground of the current frame, while background groups have comparatively lower SAD and SSD values.

Figure 6:
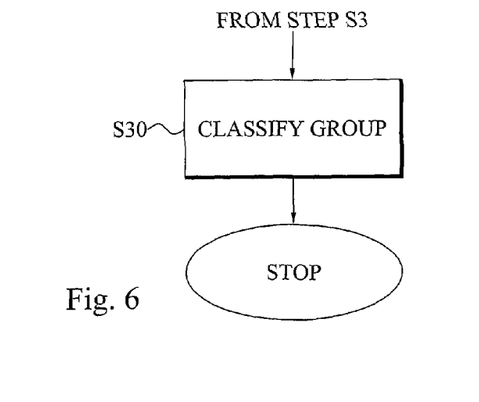
FIG. 6 is a flow diagram of an additional step of the method in FIG. 1.

FIG. 6 is a flow diagram illustrating an additional step of the image processing method of FIG. 1. The method continues from step S3 in FIG. 1. A next step S30 classifies a current group as belonging to the background or the foreground of the current frame based on the calculated classification parameter. The classification of step S30 is, as will be described further herein, preferably performed based on a comparison of the classification parameter and a threshold value. In such a case, the current group is classified as belonging to the foreground of the current frame if the calculated classification parameter exceeds the parameter and is classified as belonging to the background if it is smaller than the threshold.

Figure 7:
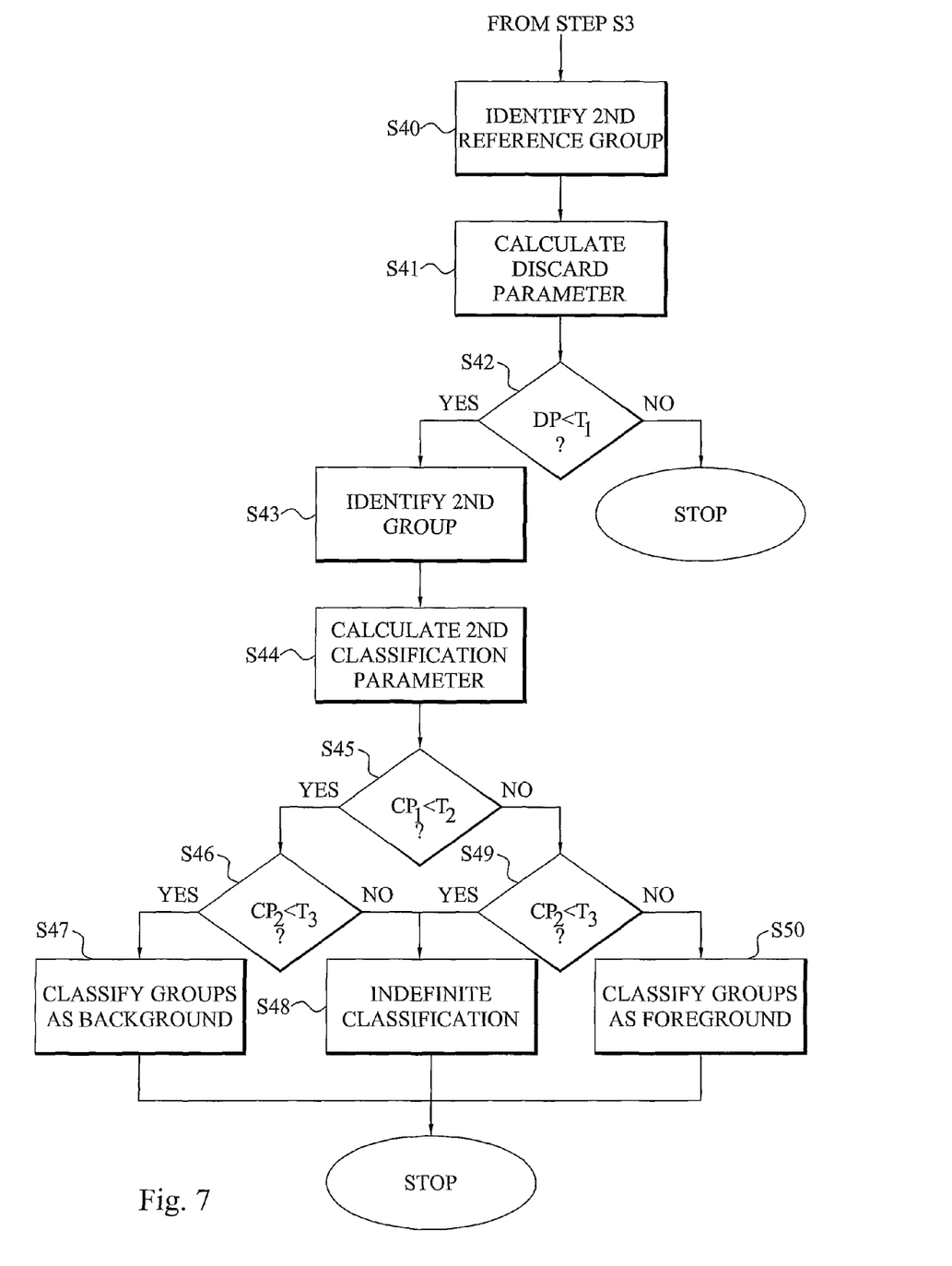
FIG. 7 is a flow diagram of additional steps of the method in FIG. 1.

With reference to FIGS. 3 and 7, preferred additional steps of the image processing method of FIG. 1 are illustrated. The method continues from step S3 in FIG. 3. A next step S40 identifies a second reference group 22 of at least one image element 24 in the reference frame 20 for the current group 12 in the current frame 10. This identification is performed based on the current group 12 and a displacement vector or representation 16 associated with the current group 12. The displacement vector 16 points from a corresponding position the current group 12 would have had in the reference frame 20 and up to the second reference group 22.

The displacement vector 16 can be fetched from the vector set previously used for calculating the global motion representation 50 for the current frame 10. Thus, the vector 16 can be obtained from the video codec or be determined in a motion estimation search.

A next step S41 calculates a so-called discard parameter based on the property values of the image elements 24 in the second reference group 22 and the property values of the image elements 14 in the current group 12. This discard parameter is preferably based on the absolute values of the pairwise differences in property values for image elements occupying corresponding positions in the current group 12 and the reference group 22. The calculation is preferably performed in a similar manner to the classification parameter calculating described above with the difference that now it is the image property values of the second reference group 22 identified by the displacement vector 16 that are used and not the property values of the first reference group 28 identified based on the global motion representation 50.

The discard parameter is preferably of a same parameter type as the previously described first classification parameter. In other words, if the classification parameter is a SAD (SSD) value, the discard parameter is preferably also a SAD (SSD) value.

The calculated discard parameter DP is compared to a first threshold value $T_1$ in step S42. If the discard parameter is smaller than the first threshold, the method continues to step S43 otherwise the method ends and no classification of the current group is possible or the classification is solely based on the first calculation parameter calculated in step S3 of FIG. 1.

In step S43, a second group 18 of at least one image element 14 is identified in the current frame 10 based on the second reference group 22 in the reference frame 20 and the global motion representation 50. This second group 18 is identified by applying the global motion representation 50 from a corresponding position the second reference group 22 would have had in the current frame 10 and then the representation 50 points to the position of the second group 18. As is evident from FIG. 3, the direction of the global motion representation 50 is opposite when going from the current group 12 to the first reference group 28 as compared to starting from the second reference group 22 and ending at the second group 18. Thus, if the global motion representation 50 had the values $$v = \begin{bmatrix} v_x \\ v_y \end{bmatrix}$$

in the former case, it preferably has the value $$-v = \begin{bmatrix} -v_x \\ -v_y \end{bmatrix}$$

in the second case.

A next step S44 calculates a second classification parameter based on the differences in image element property values of the second reference group 22 and the second group 18. This step S44 is preferably performed in a similar way to the calculation of the first classification parameter with the differences in that it is the property values from the second group 18 and second reference group 22 that are used and not the values from the current group 14 and the first reference group 28. Thus, pairwise differences between property values of image elements 14, 24 occupying corresponding positions in the second group 18 and the second reference group 22 are calculated. The absolute values of the differences are then summed to get a SAD-based second classification parameter or the squared differences are summed to obtain the second classification parameter in the SSD form. The second classification parameter $CP_2$ is, though, preferably in the same parameter format as the first classification parameter $CP_1$ and the discard parameter.

The first classification parameter $CP_1$ is preferably compared to a second threshold value $T_2$ in step S45. If the first classification parameter is below the second threshold, the method continues to step S46 where the second classification parameter $CP_2$ is compared to a third threshold value $T_3$. In a typical implementation, the third threshold value is equal to the second threshold value. The threshold values could be fixed or adapted or determined based on the particular video sequence.

If the second classification parameter is below the third threshold, the method continues to step S47, where the current group 12 is classified as belonging to the background of the current frame 10. However, if the second classification parameter would exceed the threshold in step S46, the method continues to step S48. In this case, the first parameter is below its threshold value, while the second classification parameter exceeds its threshold value. In such a case, the classification of the current group 12 could be regarded as indefinite or alternatively only the first classification parameter is utilized, i.e. the group 12 will be regarded as a background group.

If the first classification instead exceeds the second threshold value in step S45, the method continues to step S49, where the second classification parameter is compared to the third threshold in similarity to step S46. Once again the classification of the current group 12 could be regarded as indefinite if the second classification parameter is below the third threshold, i.e. one parameter exceeds its threshold while the other falls below. However, if also the second classification parameter exceeds its compared threshold in step S49, the method continues to step S50, where the current group 12 is classified as belonging to the foreground of the current frame 10.

An alternative that avoids an indefinite classification is to calculate a weighted sum of the two classification parameters, preferably using same parameter weights. The sum is then compared to a classification parameter. Another possibility is to classify a current group as belonging to the foreground if and only if both classification parameters exceed the respective threshold values, otherwise the group is regarded as belonging to the background.

It is anticipated by the present invention that the order of comparisons can be exchanged so that the second classification parameter is first compared with the third threshold before the first parameter is compared to the second threshold value. Comparatively, the comparison with the discard parameter can be performed or after the comparisons of the classification parameters.

Thus, in this particular embodiment, the classification of the current group 12 is performed based both on the first classification parameter and the second classification parameter and preferably also the discard parameter. However, in another embodiment of the present invention the steps S41 and S42 are omitted, so then the classification is made without the discard parameter and instead utilizes the first and second parameters.

The method described above is preferably performed on all groups 12 in the current frame 10 to thereby form a complete classification of the groups as background groups or foreground groups (or indefinite classification). In an optional continuation of the image processing method, a refined updating of the global motion representation can be performed based only on those groups classified as belonging to the background of the current frame 10. In such a case, the determination can be performed according to any of the previously described embodiments, though only utilizing the background groups. For instance a new estimation of the matrix A' and vector b' can be performed utilizing the displacement vectors associated with the background groups to determine an updated global motion representation v'.

A new classification parameter calculation and classification parameter process can then be performed based on the updated global motion representation. This can be repeated in an iterative way by generating an updated global motion representation based on a previously performed calculation to get a more and more accurate global motion representation and group classification. However, for the majority of image frames the global motion determination and the classification need only be performed once, i.e. no updating or refinement.

The classification parameter determined according to the present invention and the classification of groups into background versus foreground groups can advantageously be utilized when interpolating or extrapolating new frames in connection with frame rate up-conversion.

FIG. 8 illustrates a situation that can arise during such an up-conversion. The image to the left corresponds to a previous reference frame 20 in a video sequence and illustrates a portion of a football field with a football to the left in the picture. A later frame 10 in the video sequence basically shows the same football field portion but now the football is to the right of the picture. In the rate up-conversion an intermediate frame 30 is to be interpolated between the reference frame 20 and the current frame 10. For the human viewer it is not hard to guess that this intermediate frame 30 would show the football field with the football basically in the middle of the lower half of the picture. However, the prior art rate up-conversion schemes that only performs the interpolation based on motion vectors between groups in the current 10 and reference 20 frames and do not base the interpolation at least partly based on a foreground/background classification will probably generate an intermediate frame 30 with no football at all as described in the background section.

Figure 9:
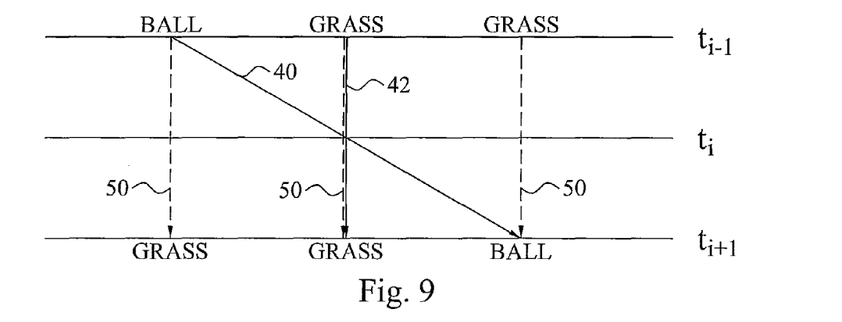
FIG. 9 is a diagram illustrating a method of selecting motion vector according to an embodiment of the present invention.

FIG. 9 schematically illustrates the superior interpolation of the present invention for the example illustrated in FIG. 8. In this case, the global motion of image element property values from the previous frame 20 at time instance $t_{i-1}$ to the current frame 10 at time instance $t_{i+1}$ will be the zero motion (since the background does not move at all between the two frames 10, 20). There are two candidate displacement vectors for the middle area in the intermediate frame 30 at time instance $t_i$: the one that captures the motion of the ball, represented by displacement vector 40, and the one that captures the (zero) motion of the background in the middle, represented by the vector 42. If the global motion representation 50 is applied to an image element group covering the ball in the previous frame 20, we arrive at an image element group in the subsequent frame 10 covering grass. Correspondingly, if we start at an image element group in the lower right of the previous frame 20, i.e. containing grass of the background, and moves according to the global motion into the subsequent frame 10, we would then arrive at a group covering the football. This means that the area pointed out by the displacement vector 40 associated with the motion of the ball has a bad match in the global motion 50 since one of the frames 10, 20 contains a ball and the other frame 10, 20 contains grass at those specific areas. Thus, a classification parameter that is calculated based on the pixel parameter values of grass group and the football group would have a high parameter value.

However, the (zero) displacement vector 42 from the grass in the middle of the lower half of the previous frame 20 to a grass group in the middle of the lower half of the subsequent frame 10 have a good match with the global motion 50 since the displacement vector 42 and the global motion representation 50 are both zero in this case. Therefore, a classification parameter calculated based on the difference in property values of the groups in the previous 20 and subsequent frames 10 identified by applying the global motion 50 would in this case below as both shows background grass.

Applying the image processing of the present invention to this simple example, the image element groups corresponding to the football would be classified as foreground, while remaining groups are background. This classification is then utilized when selecting between the two candidate displacement vectors 40, 42. Therefore, by basing the interpolation at least partly on the classification of the invention, the (correct) displacement vector 40 would be selected for the middle area in the lower half of the intermediate frame 30 even though the other (zero) candidate vector 42 would probably achieve a lower discrimination value, such as SAD or SSD value, as compared to the football vector 40.

One might think that it would be easier to compare a candidate motion vector 40, 42 to the global motion 50 directly; if they differ enough, the vector 40, 42 corresponds to a foreground object. Unfortunately such a process can easily be fooled. In the case with the ball in FIG. 8, there is an area to the right of the football in the previous 20, see FIG. 10, which resembles an area to the left of the ball in subsequent frame 10. The displacement vector 44 for this third alternative is shown in FIG. 11 together with the other two candidates 40, 42 described above.

Figure 10:
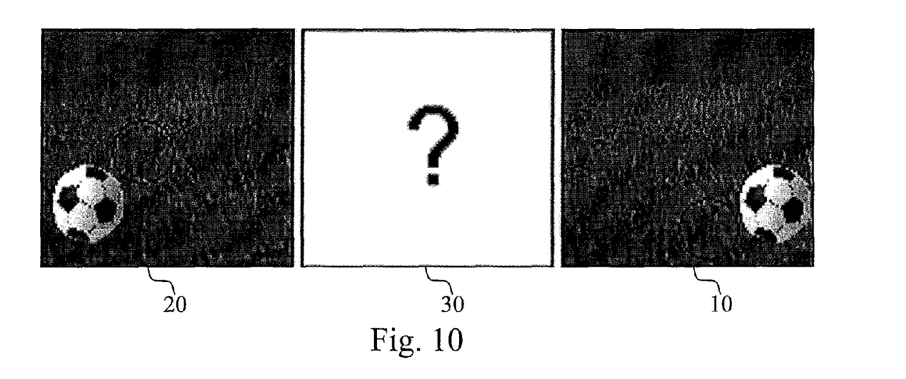
FIG. 10 is a flow diagram illustrating two image frames with an intermediate image frame to be interpolated.
Figure 11:
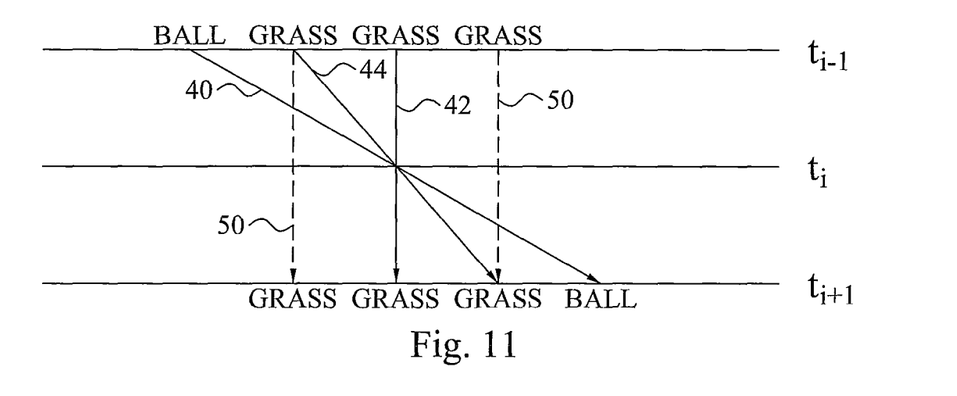
FIG. 11 is a diagram illustrating problems in selecting motion vectors.

A motion vector 44 that points between the marked areas in FIG. 10 are different from the (zero) global motion 50, but still does not correspond to a foreground object. This is evident as the classification parameter obtained by calculating the difference in image element property values from a group in the circle in the previous frame 20 and a group in the subsequent frame 10 identified based on the global motion representation 50 is comparatively low as is the parameter obtained by starting from a group in the circle in the subsequent frame 10 and moving according to the global motion 50 to a group in the previous frame 20. In this case, all four groups will correspond to grass objects and therefore form part of the background. Thus, if displacement vectors 40, 42, 44 would directly be compared to the global motion representation 50, groups would become misclassified as in this case. However, with the present invention it is easy to see that the areas pointed out by the third alternative is part of the background since they both have good matches in the global motion.

Figure 12:
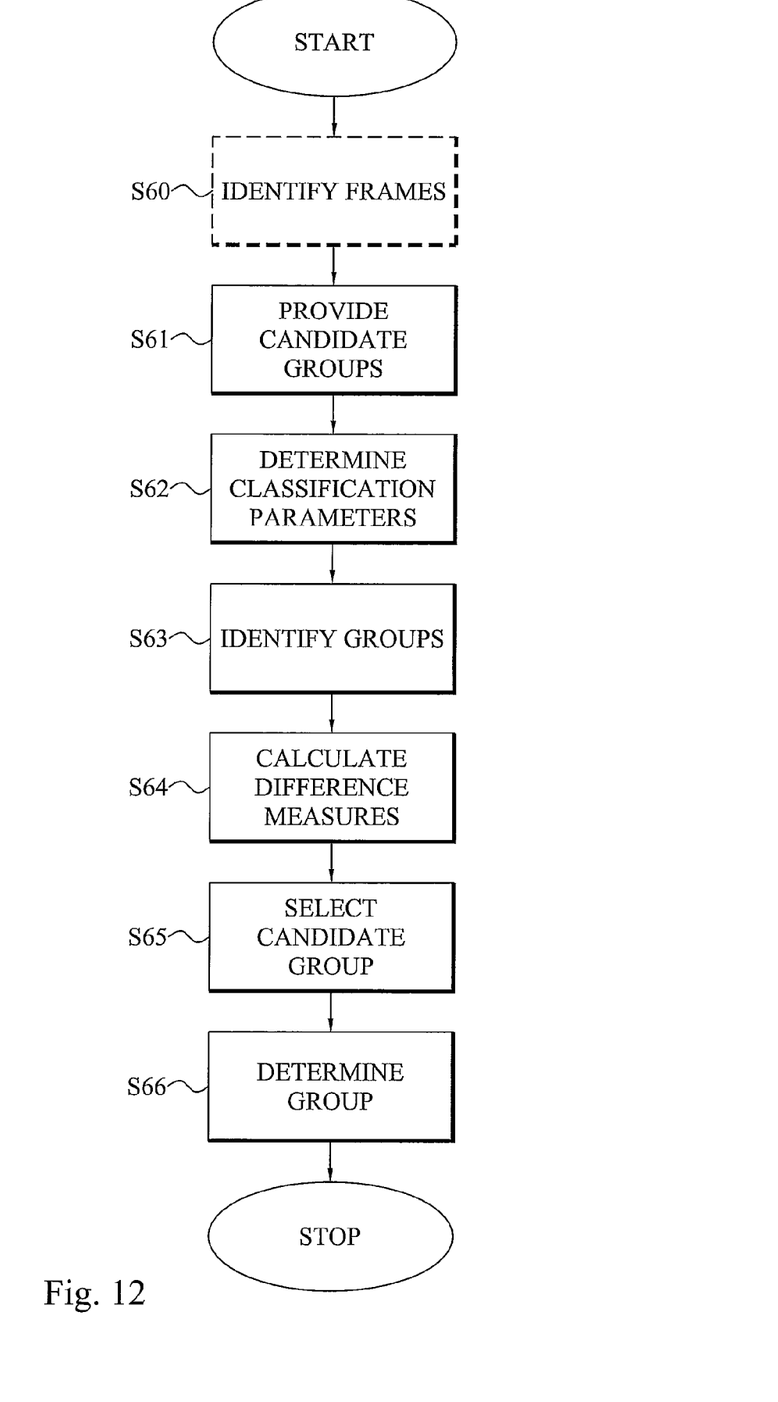
FIG. 12 is a flow diagram of an interpolation method according to an embodiment of the present invention.

FIG. 12 is a flow diagram illustrating a method of estimating property values of a group of at least one image element in a frame associated with a time instance in a video sequence. This estimation is preferably performed as a part of a rate up-conversion procedure to add one or more frames to a video sequence through frame interpolation or extrapolation.

The method starts in the optional step S60, where at least two frames in the video sequence to use in the estimation are identified. In a typical embodiment, one of the frames corresponds to a previous time instance relative the intermediate frame to be interpolated while the other of the frames corresponds to a subsequent time instance in the sequence. In a preferred embodiment, the two frames are the frames that are positioned immediately before and immediately after the intermediate frame in terms of time. In other words, the frames could be regarded as neighboring frames. In this frame interpolation, more than two frames can actually be used, such as using N previous frames corresponding to time instance $t_{i-1}, t_{i-3}, \ldots, t_{i+1-2N}$ and M following frames corresponding to time instances $t_{i+1}, t_{i+3}, \ldots, t_{i-1+2M}$, for interpolating a frame of time instance $t_i$.

Correspondingly, when extrapolating a frame at time $t_i$ two or more previous frames at times $t_{i-1}, t_{i-3}, t_{i+1-2N}$ or two or more following frames at times $t_{i+1}, t_{i+3}, \ldots, t_{i-1+2M}$ are used.

A similar procedure regarding interpolation and extrapolation can be applied in the spatial domain instead of the time domain. In such a case, a new "view" is interpolated or extrapolated from two images or frames with different angles and/or displacements though, possibly, same time.

A next step S61 provides a set of multiple, i.e. at least two, candidate groups in a first (previous or subsequent) frame associated with a previous or following time instance in the video sequence compared to the frame to be determined. Each of these candidate groups comprises at least one image element and is associated with a respective displacement representation or vector. These displacement vectors can be fetched from the inter coding of the frame, i.e. from the video codec, or they can be determined from a motion estimation search. A next step S62 determines a classification parameter for each of the candidate groups. This parameter determination is performed according to any of the previously described embodiments of the invention.

A next step S63 identifies, for each candidate group, a respective reference group of at least one image element in a second (previous or subsequent) frame associated with a previous or following time instance in the video sequence. The reference group associated with the candidate group is preferably identified based on the displacement vector associated with the candidate group. Thus, the displacement vector points, when applied from a corresponding position that the candidate group would have had in the second frame, towards the reference group. Each candidate group now has a determined classification parameter and an identified reference group.

The following step S64 calculates, for each candidate group, a difference measure representative of a difference in property values of the image elements in the candidate group and its identified reference group. In a preferred embodiment, the measure is calculated based on the absolute values of the difference in property values for image elements occupying corresponding positions in the candidate group and the reference group. Preferred examples of such difference measured include SAD and SSD.

A next step S65 selects a candidate group from the provided group set based on the calculated difference measures and the determined classification parameters. The selection of step S65 is preferably performed based on a selection parameter calculated from the classification parameter and the difference measure, such a weighted sum thereof. A preferred such selection parameter e could be defined as $e=w_1 \times DM - w_2 \times CP$, where DM is the difference measure and CP is the classification parameter for a candidate group and $w_1$, $w_2$ are weights. The candidate group having the smallest associated value e is then selected in step S65. By investigating the selection parameter e, one realizes that a group being classified as foreground (high classification parameter) is favored over a background group (low classification parameter). Furthermore, candidate groups having an associated reference group that is a good match to the image element property values of the candidate group (low difference measure) is likewise favored as compared to candidate groups having worse matches in the second frame. In a preferred embodiment, $w_1 > w_2$ to put a larger weight on the influence of the difference measure in the selection than the group classification. It is evident from the discussion above that the weights are non-zero (positive) weights.

Finally step S66 determines the property values of the group in the interpolated/extrapolated frame based on the property values of the selected candidate group and the reference group associated with the selected candidate group. In a preferred embodiment, the image element property values are determined as a linear combination of the property values of the selected candidate group and the associated reference group. The weight applied to the property values in the selected group and the weight of the property values in the associated group are preferably determined based on difference in time between the interpolated/extrapolated frame and the first frame with the selected candidate group and the interpolated/extrapolated frame and the second frame, respectively. In other words, larger weights are used if the distance in time is small as compared to longer time distances. The values of the frame weights can also be utilized to reflect acceleration as is known in the art.

In the embodiment described above, the reference groups associated with the candidate groups are identified based on the displacement vectors assigned to or estimated for the candidate groups. This then presumes that a same vector is used for traveling from a candidate group to the group to be interpolated/extrapolated as when going from the group to be determined to a reference group. The present invention is though not limited thereto.

In another embodiment, a second set of multiple second candidate groups present in the second frame is provided together with the provision of the first set of multiple first candidate groups in the first frame. Also these second candidate groups comprise at least one image element each and preferably have a respective displacement vector. A second classification parameter is determined as previously described for each of the second candidate groups in addition to the first classification parameters for the first candidate groups. A difference measure can then be calculated for each pair of one first candidate group and one second candidate group from the first and second sets, respectively. Alternatively, not all combinations of first and second candidates are tested but only a limited portion thereof, reflecting plausible combinations of candidate groups, such as groups present on the same frame positions in the first and second frames and groups having associated displacement vectors identifying other candidate groups in the other frames.

A first and a second candidate group are thereafter selected based on the first and second classification parameters and the difference measures. The image element property values of the group to be determined are calculated based on the property values of these selected candidate groups as previously described.

Figure 13:
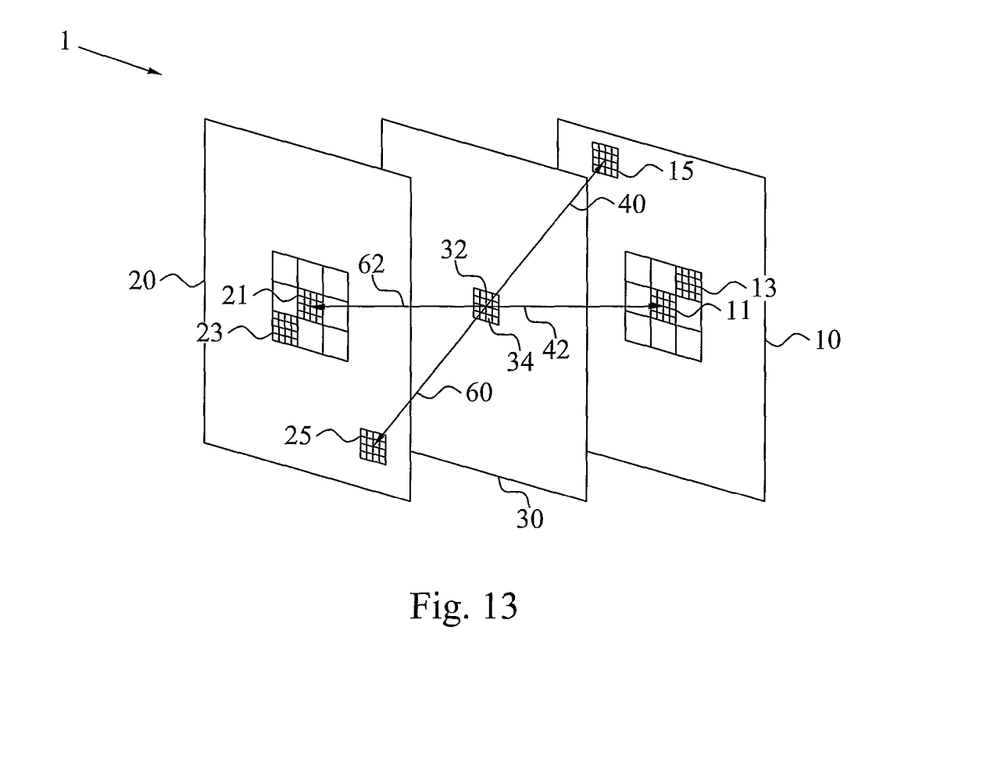
FIG. 13 is a diagram illustrating candidate motion vectors that can be used in the interpolation method.

FIG. 13 illustrates a portion of a video sequence 1 having a first frame 10 and a second frame 20 and an intermediate frame 30 to be determined during frame rate-up conversion. A group 32 of image elements 34 to be determined is indicated in the intermediate frame 30. Suitable first candidate groups 11, 13, 15 are shown in the first frame 10 and corresponding second candidate groups 21, 23, 25 are shown in the second frame 20. These candidate groups typically comprise the groups 11, 21 having the corresponding position in the first 10 and second 20 frame as the group 32 has in the intermediate frame 30. The displacement vectors 42, 62 of these groups 11, 21 have been indicated in the figure, passing through the group 32 to be determined. Other candidates are obtained by utilizing the displacement vectors from the neighboring groups 13, 23 of these candidate groups 11, 21. Also those groups 15, 25 having associated displacement vectors 40, 60 that pass through the group 32 in the intermediate frame 30 are preferred candidate groups according to the invention.

The group classification and the classification parameters calculated according to the present invention can, as has been disclosed in the foregoing, advantageously be utilized during frame rate up-conversion for interpolating or extrapolating new frames of image element groups. The present invention, though, has other applications in the field of image processing. For instance, the classification can be utilized in connection with an error concealment mechanism for lost frames, where a distorted frame or a part thereof is replaced by uni-directional (extrapolation) or bi-directional (interpolation) prediction from neighboring frames in a video sequence. The refinement achieved by utilizing the classification parameter in such frame (part) replacement may lead to more accurate replacement as compared to prior art solutions.

Figure 14:
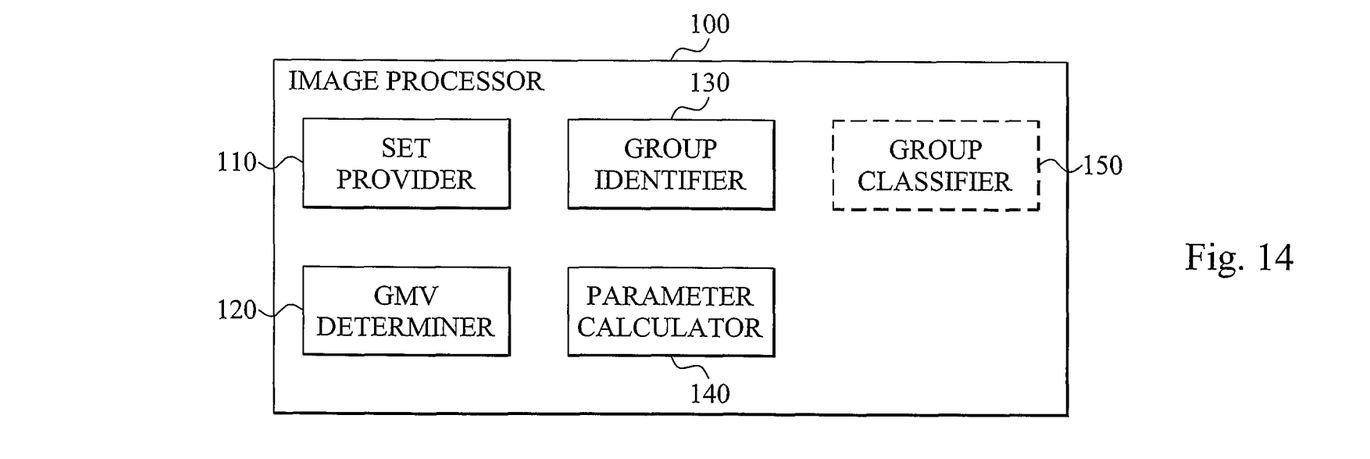
FIG. 14 is a schematic block diagram of an image processor according to the present invention.

FIG. 14 is a schematic block diagram of an image processor 100 according to the present invention. The processor 100 is applicable to a frame sequence, such as a video sequence, comprising multiple frames having groups of at least one image element. A global motion determiner 120 is arranged in the processor 100 for determining a representation of a global motion of image element property values from at least a portion of a reference frame to at least a portion of a current frame in the sequence. The determiner 120 is preferably connected to a set provider 110, which is arranged for providing a vector set comprising, for each image element group in the portion of the frame, a displacement vector referring to a reference group in the reference frame. The set provider 110 can fetch this set from an internal or external video codec, or include functionality for estimating the displacement vectors in a motion estimation search. The determiner 120 preferably generates the global motion representation as one of the previously described position-dependent global motion vectors, by determining matrix A and vector b of the global motion representation.

A group identifier 130 is provided in the processor 100 for identifying, for a current group in the current frame, a reference group in the reference frame based on the global motion representation from the determiner 120.

A parameter calculator 140 calculates a classification parameter for the current group based on a difference in image element property values of the current group and the reference group identified by the group identifier 130. This parameter is indicative of whether the group belongs to the background or foreground of the current frame. As a consequence, an optional but preferred group classifier 150 is implemented for classifying the current group as a background or foreground group using the classification parameter. In this classification operation, the classifier 150 preferably compares the parameter with a threshold value and classifies the block as a foreground block if the parameter exceeds the threshold value, otherwise it is regarded as a background group.

In a preferred embodiment, the group identifier 130 also identifies a second reference group in the reference frame. In clear contrast to the first reference group, which was identified based on the global motion representation determined by the global motion determiner, the second reference group is identified based on the displacement vector associated with the current group and can be fetched or estimated by the set provider 110. The group identifier 130 also utilizes the global motion representation and the new identified second reference group for identifying a second image element group in the current frame. Taken together we therefore have four groups: the current group in the current frame; the first reference group in the reference frame identifiable starting from the current group and utilizing the global motion representation; the second reference group in the reference frame identifiable starting from the current group and utilizing its associated displacement representation; and the second group in the current frame identifiable starting from the second reference group and utilizing the global motion representation.

The parameter calculator 140 calculates a first classification parameter based on the image element property values for the current group and the first reference group and calculates a second classification parameter based on the property values of the second group and the second reference group. The group classifier 150 uses both the first and second classification parameters in the classification of the current group. Thus, if both the first and second parameter exceeds a respective threshold value, which are preferably the same, the current group is a foreground group, and if both parameters are below the respective threshold values, the group is a background group. Otherwise the classification can be regarded as indefinite.

Alternatively, the parameter calculator 140 calculates a single classification parameter as a weighted sum of the first and second classification parameter. This single parameter is compared to threshold value and used for discriminating between a foreground group (high parameter value) and background group (low parameter value).

In a further embodiment, the calculator 140 also calculates a discard parameter that is utilized by the classifier 150 in the group classification. The discard parameter is calculated based on the absolute values of the differences in property values for image elements having corresponding positions in the current group and in the second reference group. The discard parameter can, for instance, be a SAD or SSD parameter. The classifier 150 preferably compares the discard parameter with an associated threshold value and could abort the classification or only elect to utilize the first classification parameter if the discard parameter exceeds its threshold.

The units 110 to 150 of the image processor 100 can be provided in hardware, software and/or a combination of hardware and software. The units 110 to 150 can be implemented in a video or frame processing terminal or server, such as implemented in or connected to a node of a wired or wireless communications system. Alternatively, the units 110 to 150 of the image processor 100 can be arranged in a user terminal, such as TV decoder, computer, mobile telephone, or other user appliance having or being connected to an image rendering device.

Figure 15:
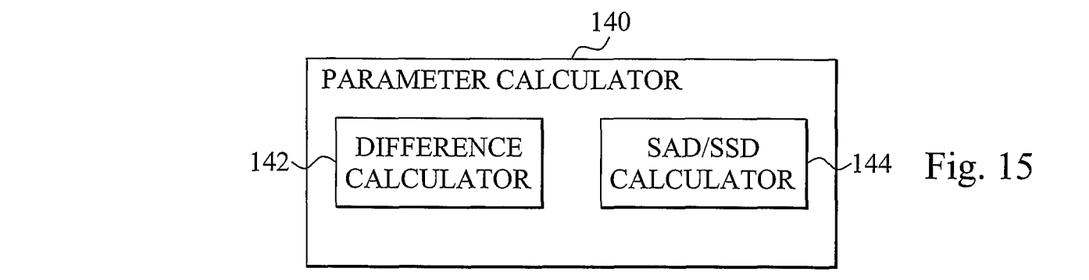
FIG. 15 is a schematic block diagram of the parameter calculator in FIG. 14.

FIG. 15 is a schematic block diagram illustrating a possible implementation of the parameter calculator 140 of FIG. 14.

The calculator 140 comprises a difference calculator 142 for calculating differences in property values of image elements occupying corresponding positions in two different groups, such as the current group and the first reference group. A SAD/SSD calculator 144 calculates a classification parameter based on the absolute values of the differences from the difference calculator 142, such as the sum of the absolute values or the sum of the squared absolute values.

The units 142 and 144 of the parameter calculator 140 may be implemented in hardware, software and/or a combination of hardware and software.

Figure 16:
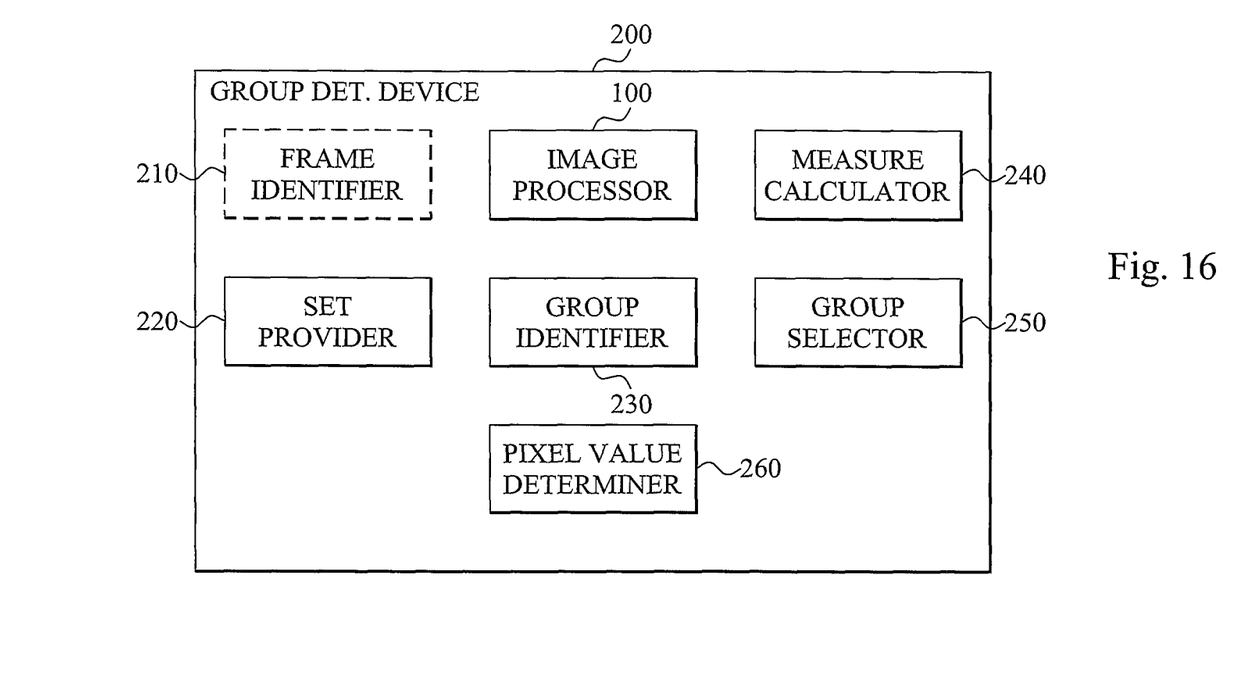
FIG. 16 is a schematic block diagram of a block interpolator according to the present invention.

FIG. 16 is a schematic block diagram of device 200 for determining a group of image elements by estimating the property values of the at least one image element in the group. The device 200 optionally comprises a frame identifier 210 for identifying at least a first and a second frame in a video sequence. These two frames are associated with different time instances in the sequence as compared to a current frame comprising the group to be determined. In the case of group interpolation, the first frame is a previous or following frame, while the second frame is a following or previous frame. For group extrapolation both the first and second frames are previous or following frames in relation to the current frame.

A set provider 220 is arranged in the device 200 for providing a set of multiple candidate groups in the first frame. Each of the candidate groups comprise at least one image element and has a respective displacement vector. An image processor 100 of the present invention as described above and disclosed in FIG. 14 is arranged in the device 200 for calculating a respective classification parameter for each candidate group in the set.

A group identifier 230 identifies a respective second group in the second frame for each of the candidate groups. This identification is preferably performed based on the displacement vectors associated with the candidate groups. A measure calculator 240 calculates a difference measure for each candidate group, where the measure is representative of a difference in property values of the candidate group and its identified second group. The measure is preferably a SAD or SSD measure, i.e. based on the absolute values of the image element differences.

The device 200 also comprises a group selector 250 for selecting a candidate group from the provided set based on the classification parameters from the image processor 100 and the difference measures by the calculator 240. The selector 250 preferably calculates a weighted difference or sum of the measure and classification parameter for each candidate and then selects the candidate group leading to the smallest weighted difference/sum. A value determiner 260 determines the property values of the current group based on the property values of the selected candidate group and its associated second group, typically a linear combination of the image element values of these two groups.

As has previously been indicated, the set provider 220 can provide another set of multiple second candidate groups in the second frame. In such a case, the image processor 100 also calculates second classification parameters for these candidate groups. The selection of first and second candidate group by the group selector 250 is performed based on the first and second classification parameters and the difference measures. The property values of the selected first and second candidate group are utilized by the value determiner 260 for interpolating or extrapolating the property values of the current group.

The units 100, 210 to 260 of the determining device 200 can be provided in hardware, software and/or a combination of hardware and software. The units 100, 210 to 260 can be implemented in a video or frame processing terminal or server, such as implemented in or connected to a node of a wired or wireless communications system. Alternatively, the units 100, 210 to 260 of the determining device 200 can be arranged in a user terminal, such as TV decoder, computer, mobile telephone, or other user appliance having or being connected to an image rendering device.

It will be understood by a person skilled in the art that various modifications and changes may be made to the present invention without departure from the scope thereof, which is defined by the appended claims.

REFERENCES

[1] Choi, B. T., Lee, S. H., & Ko, S. J., 2000, New frame rate up-conversion using bi-directional motion estimation, *IEEE Trans. Consum. Electron.*, Volume 46, Number 3, pp. 603-609

[2] Zhai, J., Yu, K., Li, J. & Li, S., 2005, A Low Complexity Motion Compensated Frame Interpolation Method, The 2005 *IEEE International Symposium on Circuits and Systems* (*ISCAS*2005), Kobe, Japan, 23-26 May, 2005

The invention claimed is:

1. An image processing method applicable to a frame sequence comprising multiple frames, each frame comprising multiple groups of image elements, said method comprising the steps of:

determining a global motion representation of image element property values representing a movement of corresponding image elements from a position in at least a reference portion of a reference frame to a different position in at least a portion of a frame;

identifying, for a first group of at least one image element in said frame, a first reference group of at least one image element in said reference frame based on said global motion representation;

calculating a first classification parameter as being representative of a difference in image element property values of said first group and said first reference group;

identifying a second reference group of at least one image element in said reference frame based on a displacement vector associated with said first group;

identifying a second group of at least one image element in said frame based on said global motion representation and said second reference group;

calculating a second classification parameter representative of a difference in image element property values of said second reference group and said second group, said first classification parameter and said second classification parameter being indicative of whether said first group belongs to a foreground or a background of said frame; and providing a vector set comprising, for each group of image elements in said at least a portion of said frame, a respective displacement vector referring to a reference group of image elements in said reference frame of said frame sequence;

wherein said determining step comprises determining, based on at least a portion of said displacement vectors of said vector set, said global motion representation, wherein a position-dependent global motion vector is determined based on said at least a portion of said displacement vectors of said vector set, wherein the position-dependent global motion vector is determined by estimating, based on said at least a portion of said displacement vectors of said vector set, elements of matrix $$A = \begin{bmatrix} a_{11} & a_{12} \\ a_{21} & a_{22} \end{bmatrix}$$

and a vector $b=[b_1 b_2]^T$ by a least square method to determine said position-dependent global motion vector as having a formula:

$$v=Ax+b$$

where $v=[v_x v_x]^T$ is said global motion vector, $v_x$ is a first vector component of said position-dependent global motion vector in a first direction, $v_y$ is a second vector component of said position-dependent global motion vector in a second perpendicular direction, $x=[xy]^T$ is an image element position in said frame.

2. The method according to claim 1, wherein said step of calculating the first classification parameter comprises the steps of:

calculating, for each image element in said first group, a difference between said image element property value of said image element and said image element property value of an image element having a corresponding image element position in said first reference group; and calculating said first classification parameter based on absolute values of said differences.

3. The method according to claim 1, further comprising the steps of:

calculating, for each image element in said second reference group of image elements, a difference between said image element property value of said image element and said image element property value of an image element having a corresponding image element position in said second group; and calculating a discard parameter based on absolute values of said differences.

4. The method according to claim 1, further comprising the step of classifying said first group as belonging to said background or said foreground based on said first classification parameter and said second classification parameter.

5. The method according to claim 3, further comprising the step of classifying said first group as belonging to a background or a foreground based on said first classification parameter, said second classification parameter and said discard parameter.

6. The method according to claim 4 wherein said classifying step comprises the step of classifying said first group as belonging to said background or said foreground based on a comparison of said first classification parameter and a first threshold value and based on a comparison of said second classification parameter and a second threshold value.

7. The method according to claim 6, wherein said classifying step comprises the steps of:

classifying said first group as belonging to said foreground if said first classification parameter exceeds said first threshold value and said second classification parameter exceeds said second threshold value; and classifying said first group as belonging to said background if said first classification parameter is smaller than said first threshold value and said second classification parameter is smaller than said second threshold value.

8. The method according to claim 1, further comprising the steps of:

performing said identifying step and said calculating step for each group of image elements in said at least a portion of said frame; and determining an updated global motion of said image element property values from said at least a reference portion of said reference frame to said at least a portion of said frame based on said groups in said at least a portion of said frame classified as belonging to said background.

9. An image processor applicable to a frame sequence comprising multiple frames, each frame comprising multiple groups of image elements, said processor comprising:
- a global motion determiner for determining a global motion representation of image element property values representing a movement of corresponding image elements from a position in at least a reference portion of a reference frame to a different position in at least a portion of a frame;
- a group identifier for i) identifying, for a first group of at least one image element in said frame, a first reference group of at least one image element in said reference frame based on said global motion representation, ii) identifying a second reference group of at least one image element in said reference frame based on a displacement vector associated with said first group, and iii) identifying a second group of at least one image element in said frame based on said global motion representation and said second reference group;
- a calculator for i) calculating a first classification parameter as being representative of a difference in image element property values of said first group and said first reference group and ii) calculating a second classification parameter representative of a difference in image element property values of said second reference group and said second group, said first classification parameter and said second classification parameter being indicative of whether said first group belongs to a foreground or a background of said frame; and
- a set provider for providing a vector set comprising, for each group of image elements in said at least a portion of said frame, a respective displacement vector referring to a reference group of image elements in said reference frame of said frame sequence;
- wherein the global motion determiner is configured to determine, based on at least a portion of said displacement vectors of said vector set, said global motion representation, wherein a position-dependent global motion vector is determined based on said at least a portion of said displacement vectors of said vector set, wherein the position-dependent global motion vector is determined by estimating, based on said at least a portion of said displacement vectors of said vector set, elements of matrix $$A = \begin{bmatrix} a_{11} & a_{12} \\ a_{21} & a_{22} \end{bmatrix}$$

and a vector $b=[b_1 b_2]^T$ by a least square method to determine said position-dependent global motion vector as having a formula:

$$v = Ax + b$$

where $v=[v_x v_x]^T$ is said global motion vector, $v_x$ is a first vector component of said position-dependent global motion vector in a first direction, $v_y$ is a second vector component of said position-dependent global motion vector in a second perpendicular direction, $x=[xy]^T$ is an image element position in said frame.

10. The processor according to claim 9, wherein said calculator comprises:
- a difference calculator for calculating, for each image element in said first group, a difference between said image element property value of said image element and said image element property value of an image element having a corresponding image element position in said first reference group; and
- a sum calculator for calculating said first classification parameter based on absolute values of said differences.

11. The processor according to claim 9, wherein said calculator i) calculates, for each image element in said second reference group of image elements, a difference between said image element property value of said image element and said image element property value of an image element having a corresponding image element position in said second group, and ii) calculates a discard parameter based on absolute values of said differences.

12. The processor according to claim 9, further comprising a classifier that classifies said first group as belonging to said background or said foreground based on said first classification parameter and said second classification parameter.

13. The processor according to claim 12, wherein said classifier classifies said first group as belonging to said background or said foreground based on said first classification parameter, said second classification parameter and a discard parameter.

14. The processor according to claim 12, wherein said classifier classifies said first group as belonging to said background or said foreground based on a comparison of said first classification parameter and a first threshold value a comparison of said second classification parameter and a second threshold value.

15. The processor according to claim 14, wherein said classifier i) classifies said first group as belonging to said foreground if said first classification parameter exceeds said first threshold value and said second classification parameter exceeds said second threshold value, and ii) classifies said first group as belonging to said background if said first classification parameter is smaller than said first threshold value and said second classification parameter is smaller than said second threshold value.

* * * * *

UNITED STATES PATENT AND TRADEMARK OFFICE
CERTIFICATE OF CORRECTION

PATENT NO.       : 8,837,591 B2
APPLICATION NO.  : 12/524298
DATED            : September 16, 2014
INVENTOR(S)      : Samuelsson et al.

Page 1 of 1

It is certified that error appears in the above-identified patent and that said Letters Patent is hereby corrected as shown below:

In the Specification

In Column 9, Lines 60-61, delete "if and only if" and insert -- if, and only if, --, therefor.

In Column 12, Line 23, delete "$t_{i-1}, t_{i-3}, t_{i+1-2N}$" and insert -- $t_{i-1}, t_{i-3},...., t_{i+1-2N}$ --, therefor.

Signed and Sealed this
Twenty-fifth Day of August, 2015

Michelle K. Lee
*Director of the United States Patent and Trademark Office*